April 17, 1934.  K. D. CHAMBERS  1,955,173
MOTOR VEHICLE HEADLIGHTING SYSTEM
Filed March 15, 1927

INVENTOR
Karl D. Chambers
BY
Prindle Bean & Mann
ATTORNEYS

Patented Apr. 17, 1934

1,955,173

UNITED STATES PATENT OFFICE 1,955,173

MOTOR VEHICLE HEADLIGHTING SYSTEM

Karl D. Chambers, Montgomery, Ala.

Application March 15, 1927, Serial No. 175,636

3 Claims. (Cl. 88—1)

The object of my invention has been to provide a motor vehicle headlighting system having selectively absorptive light filters, which are adapted for use in complementary light headlighting systems for automotive vehicles, by which the driver of one of two approaching vehicles may effectively see by his own light, while he is protected from being blinded by the headlighting of an opposing vehicle. Such a headlighting system is the subject of my United States Patent No. 1,786,518 granted December 30, 1930. To such ends my invention consists in the motor vehicle headlighting system comprising the selectively absorptive light filters hereinafter specified.

In the said complementary light headlighting system, each motor car is provided with headlights capable of projecting light of either of two different bands of wave lengths, and the driver of each car is provided with two viewing filters, one of which will permit light of one band of said wave lengths to reach the driver's eye when reflected back by an opposing car, the roadway or other objects, but which will substantially prevent light of the other band of said wave lengths from passing. The other of said viewing filters is adapted to permit light of the other of said band of wave lengths to pass to the eyes of the driver, while intercepting light of said first mentioned band of wave lengths. Thus, if the drivers coming in one direction, by convention, all use light of one band of wave lengths, and those going in the other direction all use light of the other band of wave lengths, each driver can see by the light of his own headlights perfectly, while the effect of the opposing headlights is reduced to such an extent that the driver is not at all blinded.

The object of the present invention is to provide filters for the said purpose which, while having the desired selectivity, shall transmit as large an amount of the desired light as possible, and decrease the amount of undesired light to a harmless point, and yet at the same time have both of said filters so that the usual colored signal lights may be seen through either filter.

I show in the accompanying drawing an illustrative example of the filters as they may be used, in order to disclose my invention clearly. It is to be understood that my invention may take many variant forms, and that I am not to be restricted to the particular adaptation set forth.

Figure 1:
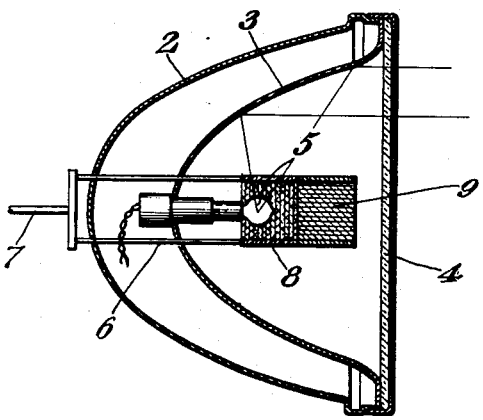
Figure 2:
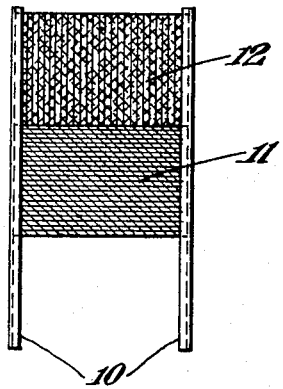

Figure 1 represents a motor vehicle head light provided with two types of projection filters adapted to be interchanged. Figure 2 represents a simple form of two viewing filters adapted to be adjusted before the driver's eyes by moving the same upward or downward in friction guides. When two headlights are used on the same vehicle, the projecting filters in use at any one time will be similar.

In Figure 1, an outer shell 2 of a headlight contains a parabolic reflector 3 with the usual plate lens 4 in the front. Numeral 5 represents the customary electric light bulb. This bulb is enveloped by a movable cylinder 6, which may be operated automatically or with manual movement by suitable attachments to rod 7. An orange filter 8 is mounted upon the movable cylinder so that rays which are reflected pass through the filter before striking the reflector. By adjusting the cylinder the blue green filter 9 may take the place of the orange filter. The color filters are made wide enough so that the light transmitted can be confined to one filter at a time. The end of the cylinder nearest the lens may be blocked if desired, so that no white light whatsoever is projected from the headlight. Thus, light is projected which has been completely filtered by the blue green filter or by the orange filter. The mechanics of this attachment are not shown herein as they are described and claimed, in my Patent #1,786,518.

Capable of many variations, Figure 2 represents the most simple arangement of two viewing filters for the driver of a car. Frictional guides 10 are mounted upon the wind-shield of a car so as to accommodate a red orange filter 12 and a blue green filter 11. This latter filter preferably contains patent blue as will hereinafter be discussed. The filters preferably form a single plate and should be capable of manual adjustment by the driver into positions in which he can use either filter. Also the filters are made sufficiently large in size to permit the driver to use one filter at a time without difficulty. Therefore, by this means, and varying in accordance with the light projected by opposing traffic, the suitable filter in the friction guide may be placed directly in line with the driver's vision.

The filters, which I shall describe, are intended for use in a system in which one of the complementary wave lengths, or colors of light used, may broadly be termed "orange", and the other of such wave lengths or colors may broadly be termed "blue", or "blue-green".

While the orange headlight and viewing filters might be made exactly alike, and the blue, or blue-green, headlight and viewing filters might be made alike, it would probably be desirable to have each of said pairs of filters slightly dissimilar. For instance, in the orange headlight filter it would probably be desirable to use a yellower orange form of the filter for filtering the light from the headlights, and a redder orange type of it for a viewing filter through which the driver looks while driving and obtaining protection by this system. The redder orange type for viewing would permit the driver to see the "Danger" signals more clearly and, of course, in any such system it is desirable not to obscure the danger signals.

On the filters for the blue-green light, the transmitting filter may be blue, or blue-green, while the viewing filter would preferably be blue-green. The blue-green viewing filter may be made as follows: It may consist of dyed gelatin coated on one piece of glass, and the gelatin protected by having another piece of glass mounted over it, so as to be protected from moisture, dust, etc. Or the gelatin may be protected by varnishing it, as with celluloid dissolved in amyl acetate. The process of coating the dyed gelatin on the glass is already known to the art. Briefly it may consist in dissolving gelatin in pure water, using a suitable amount of heat, and in then adding the dyes and pouring the gelatinous solution on a cleaned, leveled piece of plate or other glass, and allowing it to dry. It may be found necessary at times to add a small amount of glycerine or other chemical to the solution to prevent the dyed gelatin from becoming too hard and brittle, and from consequently cracking and pulling up from the glass.

The dyes used in the blue-green viewing filter are filter blue-green and patent blue. These dyes are well known to the art. The filter blue-green, when used in a filter of moderately low density, has much more of a "cut off" (that is, much higher absorptive power) in the extreme red end of the spectrum than has patent blue. Advantage is taken of that fact in preparing this particular viewing filter. Owing to the said quality of the filter blue-green, it is possible by varying the proportions of the said dyes to make the viewing filter serve more adequately its function when viewing opposing lights, which are filtered through different degrees of orange; that is, oranges which are more yellow, or which are redder, as will be explained later.

In the mixture of filter blue-green and patent blue in the viewing filter, just enough filter blue-green should be used to keep down the transmission at the extreme red end of the spectrum to such a point that a standard "Danger" red light will be just easily visible through this viewing filter, and at the same time to prevent an excess of light from coming through. The density of the combined dyes should be just enough to cut down the transmission through the filter of light previously filtered through an orange filter (on the headlights of an opposing car), to an amount small enough so that the said opposing headlights, as viewed through the viewing filter will not cause an objectionable amount of glare.

In the blue-green transmitting filter, a glass may be used, made by the batch formula which is given in United States Patent No. 1,572,625, granted February 9, 1926 to Taylor. The glass is made according to the No. 4 batch formula, the KCl being added according to the directions given in the patent. The thickness of the glass made according to this formula, which is used as the transmitting filter, should be sufficient so that the amount of light transmitted varies between 40% and 5%, depending upon the amount of "cut off", which is desired. A total transmission of about 12% makes a desirable filter.

For the orange filters, the following batch formula for the glass may be used:

| | |
|---|---|
| $SiO_2$ | 67.66 |
| $Na_2O$ | 18.977 |
| $AnO$ | 3.383 |
| $B_2O_3$ | 4.13 |
| $CaO$ | 3.41 |
| Se (metallic powdered) | .81 |
| Cd | 1.62 |
| Total to | 99.99 |

By varying slightly the percentages of the elements used, the color of the glass produced by this batch formula can be varied.

Replacing small amounts of ZnO with CaO causes the predominant hue to shift toward orange. On the other hand, replacing some of the ZnO with CaO causes the predominant hue to shift toward yellow.

When glass made according to the said formula is first poured, its color will most probably be a very light straw yellow. However, as it is poured and annealed, it changes to a darker orange, and in thicker pieces to a red orange. It will probably be found desirable, as stated above, to use a yellower orange for the transmitting filters, and a redder orange for the viewing filters, the redder orange being used to permit the red danger lights to be more easily seen.

The proportions of the color ingredients should be so chosen as to keep the slope of the absorptive curve in this glass quite steep.

It should be kept in mind that the light that reaches the eyes of the driver of a car equipped with a selectively transmitting and absorbing system of lighting has to pass through two filters. Consequently it is necessary to have these filters transmit a large percentage of the light of the wave lengths of which they have maximum transmission and a very small percentage of the light of wave lengths of which they transmit a minimum and that the slope of the transmission curve be as steep as possible. The filters of a set have to be also almost mutually absorptive.

Furthermore, it is necessary that the filters for the headlights be able to withstand the heat of the headlights. Such a set is very difficult to make. The sets described herein are the result of much experiment.

It is obvious that many changes, from what I have above described, may be made in the proportions and ingredients used, while still obtaining results in substantially the same way, and my invention is not to be confined to the precise ingredients and proportions above given.

I claim:

1. In a motor vehicle, the combination of headlights each having a pair of filters, and a pair of filters for the driver, one of each of said pairs of filters having filter blue-green therein, one of said last-mentioned filters also having patent blue therein, and the other of each of said pairs of filters having orange therein.

2. In a motor vehicle, the combination of headlights each having a pair of filters, and a pair of filters for the driver, one of each of said pairs of filters having blue-green therein, and the viewing blue-green filter also having blue therein, the proportion of blue-green being made sufficiently low to transmit a danger red light in such quantity as to be easily visible, and at the same time to prevent an excess of such light from coming through, and the other of each of said pairs of filters having orange therein.

3. In a motor vehicle, the combination of headlights each having a pair of filters, and a pair of filters for the driver, one of each of said pairs of filters having filter blue-green therein, and the viewing filter of said last-mentioned filters also having patent blue, the proportion of filter blue-green being made sufficiently low to transmit a danger red light in such quantity as to be easily visible, and at the same time to prevent an excess of such light from coming through, and the other of each of said pairs of filters being orange.

KARL D. CHAMBERS.